United States Patent
Heinecke et al.

(10) Patent No.: US 11,354,564 B2
(45) Date of Patent: Jun. 7, 2022

(54) TUNING OF LOOP ORDERS IN BLOCKED DENSE BASIC LINEAR ALGEBRA SUBROUTINES

(71) Applicant: Intel Corporation, Santa Clara, CA (US)

(72) Inventors: Alexander Heinecke, San Jose, CA (US); Evangelos Georganas, San Mateo, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 16/454,318

(22) Filed: Jun. 27, 2019

(65) Prior Publication Data
US 2019/0318225 A1    Oct. 17, 2019

(51) Int. Cl.
*G06N 3/04*    (2006.01)
*G06F 9/30*    (2018.01)
*G06N 3/08*    (2006.01)
*G06F 8/41*    (2018.01)
*G06F 9/455*    (2018.01)

(52) U.S. Cl.
CPC .......... *G06N 3/0418* (2013.01); *G06F 8/4442* (2013.01); *G06F 9/30065* (2013.01); *G06F 9/45516* (2013.01); *G06N 3/082* (2013.01)

(58) Field of Classification Search
None
See application file for complete search history.

(56) References Cited

U.S. PATENT DOCUMENTS

| | | | |
|---|---|---|---|
| 5,625,552 A * | 4/1997 | Mathur | G05B 13/027 700/42 |
| 6,847,954 B1 * | 1/2005 | Wojsznis | G05B 13/0285 700/50 |
| 8,060,870 B2 | 11/2011 | Eichenberger et al. | |
| 9,946,539 B1 * | 4/2018 | Temam | G06F 9/345 |

(Continued)

OTHER PUBLICATIONS

Hwu et al., "Advanced Algorithmic Techniques for GPUs," Berkeley Winter School, Lecture 3: Blocking/Tiling for Locality, Jan. 24-25, 2011 [https://iccs.lbl.gov/assets/docs/2011-01-24/lecture3_blocking_tiling_Berkeley_2011.pdf], 26 pages.

(Continued)

*Primary Examiner* — Qing Chen
(74) *Attorney, Agent, or Firm* — Hanley, Flight & Zimmerman, LLC

(57) ABSTRACT

An example includes a sequence generator to generate a plurality of sequence pairs, a first one of the sequence pairs including: (i) a first input sequence representing first accesses to first tensors in a first loop nest of a first computer program, and (ii) a first output sequence representing a first tuned loop nest corresponding to the first accesses to the first tensors in the first loop nest; a model trainer to train a recurrent neural network based on the sequence pairs as training data, the recurrent neural network to be trained to tune loop ordering of a second computer program based on a second input sequence representing second accesses to a second tensor in a second loop nest of the second computer program; and a memory interface to store, in memory, a trained model corresponding to the recurrent neural network.

30 Claims, 7 Drawing Sheets

(56) References Cited

U.S. PATENT DOCUMENTS

| | | | | |
|---|---|---|---|---|
| 9,959,498 | B1* | 5/2018 | Narayanaswami | G06N 3/04 |
| 2018/0341479 | A1* | 11/2018 | Temam | G06F 9/30072 |
| 2018/0365561 | A1* | 12/2018 | Temam | G06N 3/08 |

OTHER PUBLICATIONS

Goto et al., "Anatomy of High-Performance Matrix Multiplication," ACM Transactions on Mathematical Software (TOMS), vol. 34, Issue 3, 2008 (25 pages).

Demmel et al., "Communication-Optimal Convolution Neural Nets," Available online Apr. 24, 2018 [https://arxiv.org/pdf/1802.06905.pdf] (23 pages).

Whaley et al., "Automatically Tuned Linear Algebra Software," SC '98: Proceedings of the 1998 ACM/IEEE Conference on Supercomputing, 1998 (31 pages).

Vuduc et al., "OSKI: A Library of Automatically Tuned Sparse Matrix Kernels," Journal of Physics: Conference Series, vol. 16, No. 1, IOP Publishing, 2005 (10 pages).

Bastoul, "Code Generation in the Polyhedral Model is Easier Than You Think," Proceedings of the 13th International Conference on Parallel Architectures and Compilation Techniques, IEEE Computer Society, 2004 (11 pages).

Wang et al., "Machine Learning in Compiler Optimisation," Available online May 9, 2018 [https://arxiv.org/abs/1805.03441] (22 pages).

Cummins et al., "End-to-End Deep Learning of Optomization Heuristics," 26th International Conference on Parallel Architectures and Compilation Techniques (PACT), IEEE, 2017 (14 pages).

Eckhardt, "Choosing the right Hyperparameters for a simple LSTM using Keras," Available online Nov. 29, 2018. Retrieved from the Internet on Jun. 6, 2019 [https://towardsdatascience.com/choosing-the-right-hyperparameters-for-a-simple-lstm-using-keras-f8e9ed76f046] (9 pages).

Gottschlich et al., "The Three Pillars of Machine Programming," MAPL 2018: Proceedings of the 2nd ACM SIGPLAN International Workshop on Machine Learning and Programming Languages, Philadelphia, Pennsylvania, Association for Computing Machinery, May 2018, 11 pages.

European Patent Office, "Extended European Search Report," dated Dec. 4, 2020 in connection with European Patent Application No. 20165855.6, 10 pages.

Chen et al., "Learning to Optimize Tensor Programs," 32nd Conference on Neural Information Processing Systems (NeurIPS 2018), Montreal, CA, May 21, 2018, 16 pages.

Ravi et al., "Optimization as a Model for Few-Shot Learning," International Conference on Learning Representations (ICLR) 2017, Mar. 1, 2017, 11 pages.

\* cited by examiner

COMPILER IMPLEMENTATION

RUNTIME LIBRARY IMPLEMENTATION

TUNING OF LOOP ORDERS IN BLOCKED DENSE BASIC LINEAR ALGEBRA SUBROUTINES

FIELD OF THE DISCLOSURE

This disclosure relates generally to computer processing, and more specifically to tuning of loop orders in blocked dense linear algebra subroutines.

BACKGROUND

Linear algebra is a basic building block for many computer programs. Examples of linear algebra routines include vector addition, scalar multiplication dot products, linear combinations, and matrix multiplication. These are referred to as basic linear algebra subroutines (BLAS) which are low-level routines that can be implemented in linear algebra libraries for use by programs during execution. Such subroutines can be optimized for speed on particular machines. Dense linear algebra programs are compute bound by nature, but have a large memory footprint.

Figure 1:
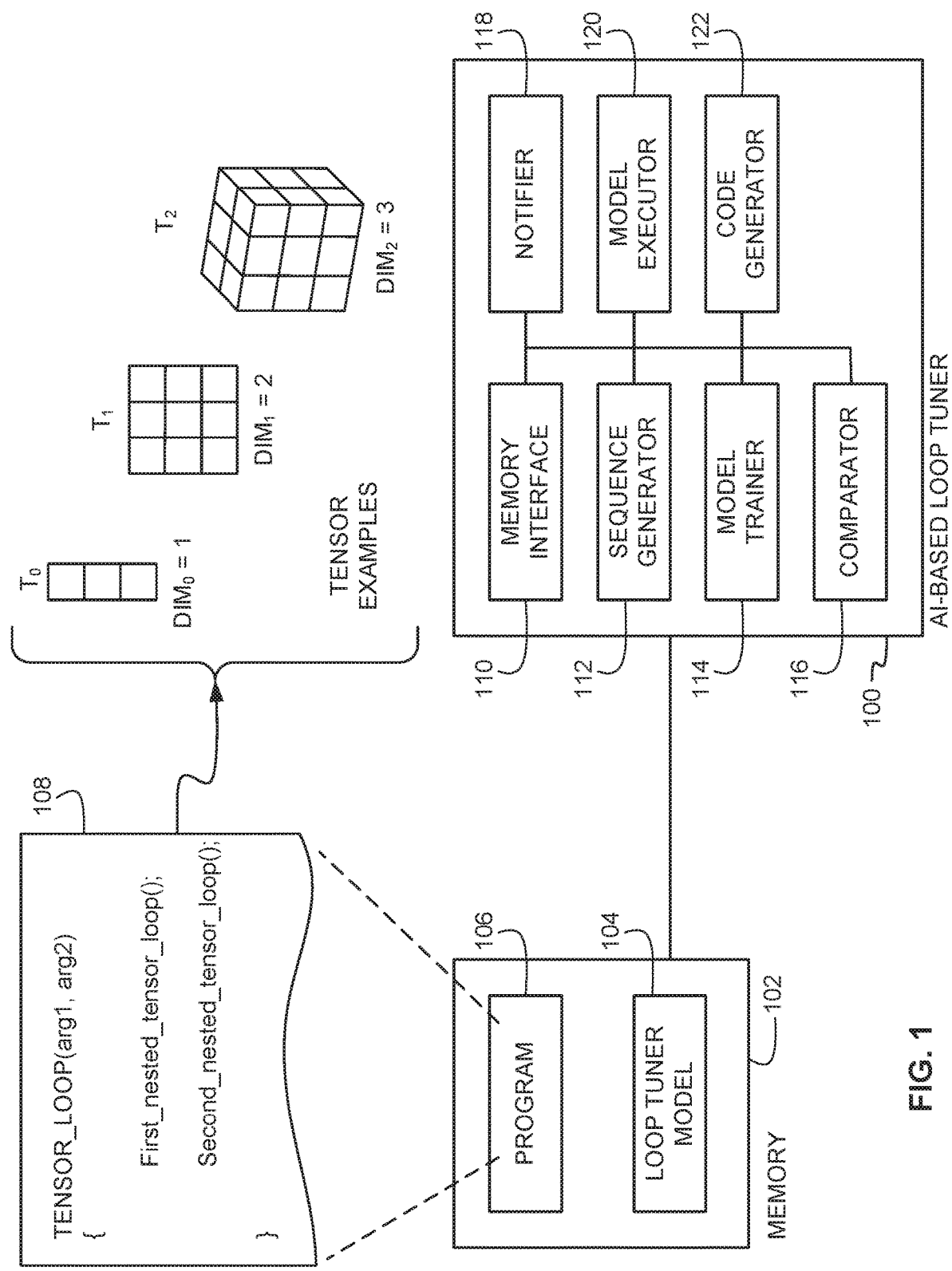
FIG. 1 is an example loop tuner that employs artificial intelligence (AI) to tune loop orders and/or blockings in blocked dense linear algebra subroutines.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Different types of machine learning models and/or machine learning architectures exist. Examples disclosed herein may be implemented using a recurrent neural network (RNN) model. Using a RNN model enables implementing the AI-based loop tuning optimizer (e.g., an AI-based loop tuner) as sequence-to-sequence (e.g., translation) tasks. In general, machine learning models/architectures that are suitable to use in example approaches disclosed herein include encoder-decoder Long Short-Term Memory (LSTM) networks, a Generative Adversarial Networks (GANs), or any other suitable RNN model. However, other types of machine learning models could additionally or alternatively be used.

Examples disclosed herein use ML/AI to implement AI-based tuning of loop orders in blocked/tiled dense linear algebra subroutines such as basic linear algebra subroutines (BLAS). As used herein, a blocked/tiled technique is used to run to dense linear algebra subroutines as long as possible using cache accesses whenever data accesses in memory are requested. Many dense linear algebra subroutines (e.g., modern deep learning kernels) include multiple loops and nested loops making them compute bound by nature because the performance of the subroutines is limited primarily by how fast a target computer can iterate through the multiple loops. In addition, dense linear algebra subroutines have a large memory footprint (e.g., significant quantities of accesses to memory to fetch data). Modern computing hardware offers fast memories called caches. Cache is used to mirror contents of memory and/or as temporary storage of data/instructions frequently accessed by a central processing unit (CPU), or processor. As such, when a program requests access to data in memory, if the requested data has been recently stored in cache, the CPU can fetch the data from cache very quickly rather than waiting additional cycles to complete an access to memory for the requested data. Cache is typically implemented on the same die or silicone substrate as a computing core of a CPU, and is typically placed in close proximity to the core. These cache characteristics, among others, enable cache to provide very fast accesses to information stored therein. Thus, cache is useful for achieving high performance execution of programs relying heavily on data accesses. However, due to the limited space on a CPU die, cache is very small in capacity. In order to exploit these limited caches as much as possible when executing dense linear algebra subroutines having large memory footprints, examples disclosed herein provide AI-based tuning of loop orders so that workloads employing BLAS or other dense linear algebra subroutines can be blocked/tiled to run as long as possible using cache accesses whenever data accesses in memory are requested.

Prior techniques for optimizing loop orderings/blockings to maximize data reuse from cache employ two different approaches. A first approach involves manual tuning (by the developer/programmer) in attempts to obtain a loop ordering of blocked/tiled code that maximizes performance. A second approach involves auto-tuning using heuristics and compiler optimizations to search the combinatorial space of solutions based on an objective of finding a loop order solution that is as close as possible to an optimal target. However, prior blocking/tiling strategies do not encapsulate the idiosyncrasies of modern cache system designs. For example, complex cache designs of multi-core systems violate optimized blockings produced by prior blocking/tiling techniques. As a result, arduous, manual work is required to resolve these issues and tune/optimize desired kernels for target systems. Drawbacks of the above-approaches are that they are time-consuming and are only based on previously studied optimization cases. As such, if such prior tuning techniques are given a new problem to optimize, the inherent models/heuristics may not be appropriate. As a result, prior tuning techniques may yield poor results in terms of performance/efficiency. In addition, even for small changes in a computer architecture, manual tuning must be repeated.

Examples disclosed herein provide an AI-based system for improving performance of loop ordering for dense linear algebra subroutines. For example, dense linear algebra subroutines such as BLAS often involve tensor mathematics. A tensor is a data structure used to organize data in arrangements representing one or more dimensions. For example, an array may be a one-dimensional tensor (e.g., a vector), and a two-dimensional matrix is a two-dimensional tensor (e.g., (x,y)). However, tensors become significantly more complex and useful in the area of AI and deep learning when used to organize data in three or more dimensions to represent, for example, real-world characteristics as input data into a deep learning model. When performing tensor mathematics, multiple nested loops are used to implement iterative memory accesses associated with solving tensor operations. For example, when executing a tensor operation of matrix multiplication between two-dimensional matrices, significant memory accesses are needed to retrieve data when multiplying row/column cell values between the two matrices. To improve performance of such data accesses on a computing platform, examples disclosed herein provide an AI-based loop tuner that optimizes the programming code of tensor operations (e.g., dense linear algebra subroutines such as a BLAS) by ordering nested loops in the programming code to rely more on cache accesses than accesses to slower memory when accessing tensor data in such tensor operations. That is, during execution of a tensor operation, as data accesses are performed in memory, tensor cell values are copied from the memory to cache on an as-requested, per-cell basis. Such cached tensor data remains in cache for a limited duration for any subsequent same-data accesses until those cache locations become stale (e.g., not recently accessed) and are overwritten by other more recently accessed data. Examples disclosed herein optimize cache use for tensor operations using an AI-based system that arranges loop orders in manners that increase the likelihood that multiple iterative accesses to the same tensor data will occur sufficiently close in time so that the same tensor data is still available in cache. This increases the number of tensor data accesses that result in cache hits (e.g., requested data still resides in cache) rather than cache misses which would require slower data accesses from slower memory interfaces.

Example AI-based loop tuners disclosed herein can be used to continuously re-train a loop tuner model after deployment of that loop tuner model in connection with code compilers and/or runtime libraries. In this manner, the optimization performance of loop tuner models using example AI-based loop tuners disclosed herein is not static based on only prior training data and scenarios known at the time of an initial training. Instead, example AI-based loop tuners disclosed herein can continuously re-train example loop tuner models after their deployment so that such loop tuner models continuously learn over time based on new programming scenarios as the AI-based loop tuners encounter and optimize different programming code. By continuous re-training, AI-based loop tuners disclosed herein can adapt loop tuner models over time to new programming techniques, new mathematical operations, different data inputs, new processors, etc. For example, given the increase in the number of deep learning kernel libraries that are developed to meet the needs of modern AI workloads, examples disclosed herein can use continuous re-training to automate performance tuning of loop tuner models. In addition, end users often use data inputs not known of at a development time when a loop tuner model is initially trained.

Examples disclosed herein can be used to implement an auto-tuner as part of a compiler and/or as part of a runtime library. When implemented in a compiler, example AI-based loop tuners disclosed herein can be executed on source code as part of an optimizer to determine loop orders of dense linear algebra subroutines before generating output object code. When implemented in a runtime library, example AI-based loop tuners disclosed herein can be called during runtime by an executing program using a function call to determine performance-optimized loop orders of dense linear algebra subroutines in the executing program. In such manners, examples disclosed herein can be used to improve application execution time by providing an AI-based approach to optimize kernel performance. A kernel refers to a central piece of code that handles core functionality for use by an application. For example, a kernel implemented in a library and/or an application may include a significant number of dense linear algebra subroutines that perform tensor operations. Performance of such kernels could be significantly improved using examples disclosed herein. Examples disclosed herein can be used to tune kernels on an on-demand basis by end users. After deployment, kernel code may be optimized using example AI-based loop tuners disclosed herein to improve performance by making better use of cache for dense linear algebra subroutines in the kernel code. In this manner, performance of system software can be improved over time without necessarily downloading patches or software updates but instead using ML-based kernel performance optimization through AI-based loop tuners disclosed herein. In addition, examples disclosed herein enable automatic tuning to further decrease development time required by developers to implement high-performance libraries/kernels. That is, instead of manually tuning loop orders, example AI-based loop tuners disclosed herein can be used to automatically train loop tuner models to more quickly and more effectively optimize loop orders in program code without manual tuning.

FIG. 1 is an example AI-based loop tuner 100 that employs artificial intelligence to tune loop orders and/or blockings in blocked dense linear algebra subroutines (e.g., BLAS). The example AI-based loop tuner 100 is in communication with example memory 102. The example memory 102 may be long term non-volatile storage or volatile random access memory (RAM). The example memory 102 stores an example loop tuner model 104 and an example program 106. In examples disclosed herein, the AI-based loop tuner 100 uses machine learning to train the loop tuner model 104 as part of compiler optimizers and/or runtime libraries. Examples disclosed herein approach the loop order optimization problem as a sequence-to-sequence (translation) task to improve performance of dense linear algebra subroutines that perform mathematical operations using data intensive tensor mathematics. Accesses of tensors in an innermost loop of programming code define an input sequence as input data to the loop tuner model 104 (e.g., a trained AI model). An output sequence provided by the loop tuner model 104 as output data contains the optimal order and/or blockings of loops corresponding to the input sequence. The example loop tuner model 104 can be implemented using an RNN such as an encoder-decoder LSTM network or a GAN (or any other suitable type of neural network) to perform such loop ordering optimization tasks. After the loop tuner model 104 is deployed, the example AI-based loop tuner 100 can be paired with reinforcement learning and/or continuous learning to continuously re-train the loop tuner model 104 over time so that optimization performance of the loop tuner model 104 can be improved based on subsequent changes to programming techniques, new mathematical operations, different data inputs, new processors, etc.

The example program 106 may be source code to be optimized during compile time using a compiler optimizer that includes the AI-based loop tuner 100, or it may be executable object code to be optimized during a runtime using a runtime library that includes the AI-based loop tuner 100. In any case, the program 106 includes one or more tensor loops 108 to be optimized to use cache accesses more effectively to improve data access performance and, thus, overall performance of executing dense linear algebra subroutines. In the illustrated example, the tensor loop 108 includes multiple nested loops that access data in different dimensions of tensors. Example tensors ($T_i$) of different dimensions ($DIM_i$) are shown in FIG. 1 as a first tensor ($T_0$), a second tensor ($T_1$), and a third tensor ($T_2$). The example first tensor ($T_1$) is an array (or vector) having one dimension ($DIM_0=1$). The example second tensor ($T_1$) is a matrix having two dimensions ($DIM_1=2$). The example third tensor ($T_2$) having three dimensions ($DIM_2=3$). When performing mathematical operations between cell values of tensors to perform tensor-based dense linear algebra subroutines, data accesses become numerous. Memory accesses to fetch data from memory are much slower than cache accesses to fetch data from cache. As such, when data is copied to cache, data access performance to the same data is improved when it is subsequently accessed from cache. Tensor-based dense linear algebra subroutines involve multiple iterative accesses to the same cell values. The example AI-based loop tuner 100 trains the loop tuner model 104 to optimize loop ordering of the tensor loops 108 in the program 106 to access data from cache as much as possible rather than requiring slower memory accesses.

To access code of the program 106, the example AI-based loop tuner 100 includes an example memory interface 110. When implemented in a compiler, the example memory interface 110 can obtain source code and/or object code of the program 106. When implemented in a runtime library, the example memory interface 110 can be invoked by a function definition that can be called by an executing process to pass object code of the program 106 to the memory interface 110 for access by the AI-based loop tuner 100.

In general, implementing a ML/AI system such as the AI-based loop tuner 100 of FIG. 1 involves two phases, a learning/training phase and an inference phase. To train the example loop tuner model 104 during a learning/training phase, the AI-based loop tuner 100 includes an example sequence generator 112, an example model trainer 114, an example comparator 116, an example notifier 118, an example model executor 120, and an example code generator 122. The example model trainer 114 includes a training algorithm to train the loop tuner model 104 to operate in accordance with patterns and/or associations based on, for example, training data provided by the example sequence generator 112 as sequence pairs. In general, the loop tuner model 104 includes internal parameters that guide how input data (e.g., input sequence pairs) is transformed into output data (e.g., output sequence pairs), such as through a series of nodes and connections within the loop tuner model 104 to transform the input data into the output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, the model trainer 114 trains the loop tuner model 104 based on unsupervised learning using Stochastic Gradient Descent with Adam optimizer. However, the model trainer 114 may additionally or alternatively use any other training algorithm. In examples disclosed herein, the model trainer 114 performs training until the example comparator 116 determines that performance of loop orders in programming subroutines satisfies a performance threshold. In some examples, the model trainer 114 performs training using hyperparameters that control how the learning is performed (e.g., a learning rate, a number of layers to be used in the machine learning model, etc.). In examples disclosed herein, hyperparameters used by the model trainer 114 control the convergence speed of the model training process and its achieved accuracy. Such hyperparameters are, for example, automatically selected by the training algorithm and/or explicitly set/tuned by a user.

The example model trainer 114 trains the loop tuner model 104 to improve performance of tensor loops in deep learning and linear algebra subroutines involving tensor mathematics. During execution of such deep learning and linear algebra subroutines, values/elements of input tensors (e.g., the tensors $T_0$, $T_1$, $T_2$ of FIG. 1) are accessed and provided as inputs to a linear algebra subroutine function to produce elements of corresponding output tensors (e.g., the tensors $T_0$, $T_1$, $T_2$ of FIG. 1). For example, in a general matrix multiplication (GEMM) subroutine, elements $A_{ik}$ and $B_{kj}$ from matrices A and B are used to contribute to element $C_{ij}$ of output matrix C via a function/relationship $C_{ij} += A_{ik} * B_{kj}$. Similarly, during inference computations using Convolutional Neural Networks (CNNs), elements from a weight tensor and an input tensor are used to add a contribution to output tensor elements. The example AI-based loop tuner 100 can be used to train the loop tuner model 104 to optimize loop orders of the tensor mathematics for such GEMM subroutines and/or CNN inference computations to more effectively use cache accesses for improved data access times and overall execution performance.

Optimizing loop ordering for high performance in dense linear algebra operations is a challenging task because there are many variables to be considered including the number of dimensions of the tensors, the dimension sizes, the number of tensor loops and nested loops, etc. The example model trainer 114 performs the training using training data that originates from known high-performance programs in which previously optimized loop orders leverage cache in a highly effective manner for data accesses during tensor loop executions. Example known high-performance programs for use in training can be obtained from repositories having large quantities of optimized open source programs and/or any other repository containing large quantities of previously optimized programs suitable for extensive deep learning training. By training the loop tuner model 104 using such previously optimized high-performance programs as training data, the loop tuner model 104 learns associations and patterns between input data and optimized output data to optimize loop orders of any subsequent input data representing unknown and unoptimized loop tensors.

The example AI-based loop tuner 100 is provided with the comparator 116 as a validation component to validate training of the loop tuner model 104. When the loop tuner model 104 is trained and is able to provide predictions (e.g., output data representing predicted optimized loop orders), the AI-based loop tuner 100 uses the comparator 116 to evaluate the model-generated solutions/loop orderings. In the illustrated example, to generate predicted optimized loop orders for program code, the AI-based loop tuner 100 is provided with the example model executor 120 and the example code generator 122. The example model executor 120 provides input data to the loop tuner model 104 and receives output data from the loop tuner model 104. The example code generator 122 generates executable code in accordance with predicted optimized loop orders represented in the output predicted loop order data. To evaluate the predicted optimized loop orders, the executable code generated by the code generator 122 can be executed while performance data is generated at an executing CPU (e.g. via hardware performance counters). The comparator 116 compares the collected performance data of the predicted optimized loop orders to a performance threshold represented by one or more target performance metrics. The target performance metrics can be generated based on known optimized loop orders using models of data movement, roofline performance models, etc. If the comparator 116 determines that the collected performance of the predicted optimized loop order solution satisfies the target performance metrics (e.g., a performance threshold) (e.g., within a tunable percentage of the target performance metric), the model trainer 114 adds the predicted optimized loop order solution to the training data and re-trains the loop tuner model 104 to further improve it. On the other hand, if the comparator 116 determines that the predicted optimized loop order solution does not satisfy the target performance metrics, the example notifier 118 presents a notification via a command line interface or a graphical user interface of a computer to prompt a user to manually tune the input program 106 using prior techniques (e.g., classic autotuning with heuristics). When the manual tuning generates an optimized loop order that satisfies the target performance metrics, the model trainer 114 provides the manually tuned optimized loop order as an additional input in the training data. The model trainer 114 then uses the updated training data to re-train the loop tuner model 104. Using such feedback loop, the AI-based loop tuner implements unsupervised learning for the loop tuner model 104.

Figure 2:
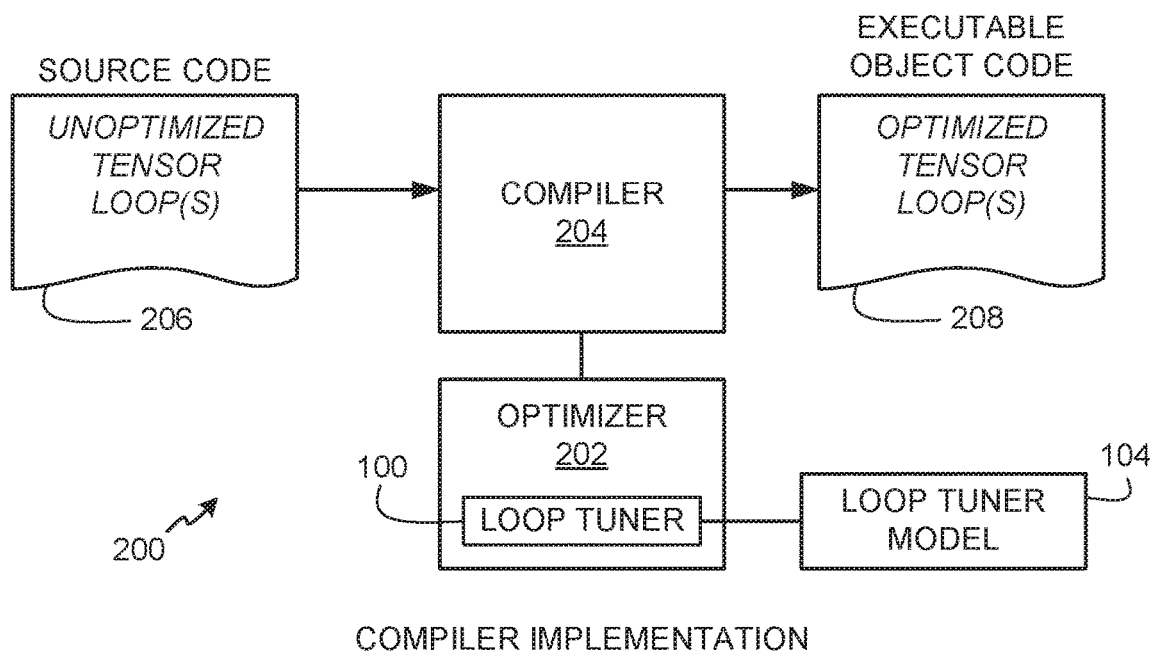
FIG. 2 is an example in which the AI-based loop tuner of FIG. 1 may be implemented as part of a compiler.

FIG. 2 is an example compiler implementation 200 in which the AI-based loop tuner 100 of FIG. 1 is implemented in an example optimizer 202 that is in communication with an example compiler 204. In the illustrated example, the compiler 204 receives source code 206 that includes one or more unoptimized tensor loop(s). In the illustrated example, the AI-based loop tuner 100 employs the loop tuner model 104 to generate predicted optimized loop tensor loop(s) that the compiler 204 can compile into executable object code 208. In some examples, the AI-based loop tuner 100 can also re-train the loop tuner model 104 over time based on received source code. For example, when the loop tuner model 104 generates predicted optimized loop orders that satisfy target performance metrics, the AI-based loop tuner 100 can re-train the loop tuner model 104 based on the input data and satisfactory output data.

Figure 3:
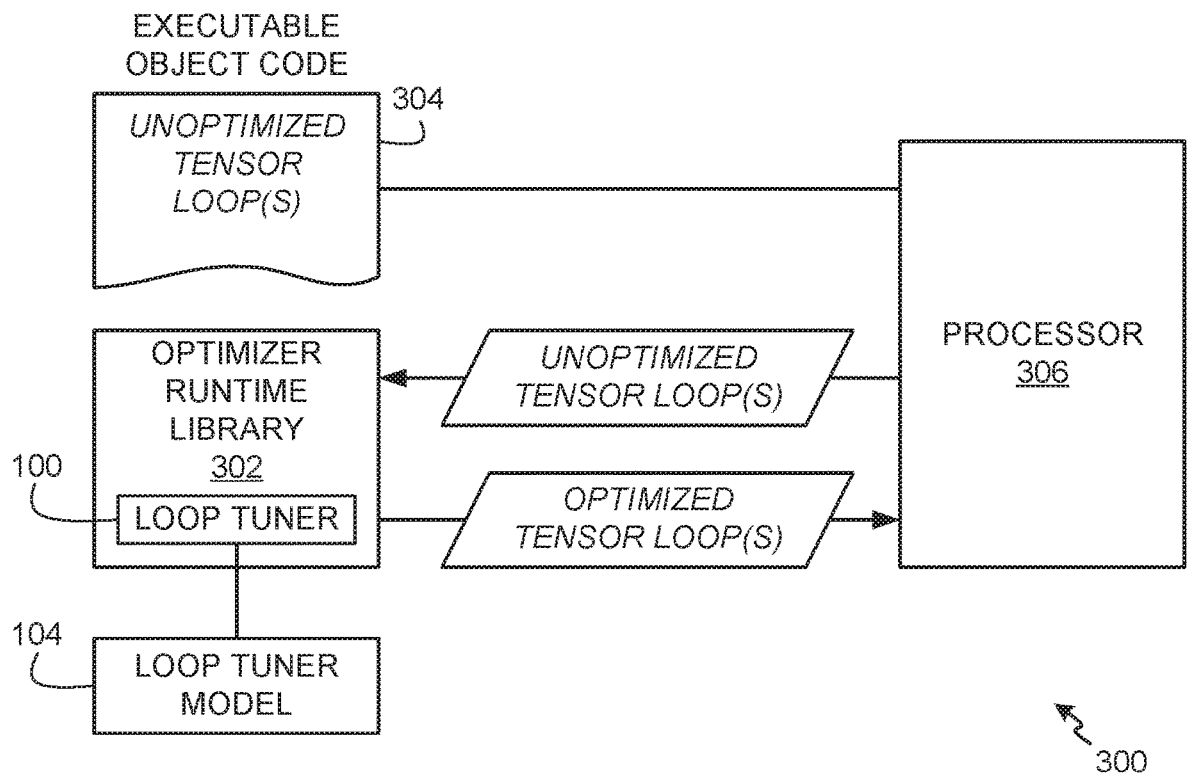
FIG. 3 is an example in which the AI-based loop tuner of FIG. 1 may be implemented as part of a runtime library.

FIG. 3 is an example runtime library implementation 300 in which the AI-based loop tuner 100 of FIG. 1 may be implemented in an example optimizer runtime library 302 that is accessible by executable object code 304 executed by a processor 306. In the illustrated example, the executable object code 304 includes one or more unoptimized tensor loop(s). The example executable object code 304 calls the AI-based loop tuner 100 in the optimizer runtime library 302 using a function call and passes the one or more unoptimized tensor loop(s) to the AI-based loop tuner 100 via the function call. The example AI-based loop tuner 100 employs the loop tuner model 104 to generate predicted optimized loop tensor loop(s) that the processor 306 can execute as part of the executable object code 304. In some examples, after an initial training, the AI-based loop tuner 100 can also re-train the loop tuner model 104 over time based on different executable object code containing unoptimized tensor loop(s) not encountered before by the loop tuner model 104. For example, when the loop tuner model 104 generates predicted optimized loop orders that satisfy target performance metrics, the AI-based loop tuner 100 can re-train the loop tuner model 104 based on the input data and satisfactory output data.

Referring again to the example tensors ($T_i$) of FIG. 1, a tensor is a single dimensional data structure (e.g., $T_0$ of FIG. 1) or a multidimensional data structure (e.g., $T_1$ or $T_2$ of FIG. 1). As noted above, a dense linear algebra subroutine can have one or more tensor loops to perform tensor mathematics involving iterative accesses to tensor cell values to perform tensor-based mathematical operations. In programming code, a tensor loop is written as a plurality of loops nested in a loop nest. When executing the loop nest, the corresponding nested loops are iteratively executed to perform multiple accesses on the corresponding tensor cell values. To illustrate such tensor structures and related loop nest representations by way of example, assume a dense algebra subroutine involves a set of tensors $T_i$ including N tensors (i=0 . . . N−1). Each tensor ($T_i$) has a quantity of dimensions ($DIM_i$), and each dimension ($DIM_i$) is of a corresponding size ($S_m$), represented in a tensor notation as $T_i[S_{DIMi-1}][S_{DIMi-2}] \ldots [S_1][S_0]$. In some instances, some dimensions may be artifacts of dimension slicing/blocking that occur on the original dimensions of corresponding tensors. A representation of a loop nest within which the tensors (T) are accessed includes loops/indices $l_i^j$ in which i represents the corresponding tensor dimension i in T (T) and j is the nested loop level for the tensor dimension i (j=0 . . . M−1, where M is the maximum loop level for that tensor dimension i). The loops/indices $l_i^j$ correspond to loops for accessing the dimension/index $l_i$ in the tensors (T) via an affine transformation $F_i(l_i^0, l_i^1, \ldots, l_i^{M-1}) \rightarrow l_i$. Boundaries B of loops are represented as loop bounds ($Blow_{ij}$, $Bhi_{ij}$) and incrementing through the loops is represented by increments ($INC_{ij}$) for loop indices $l_i^j$. In addition, a permutation vector P is used to indicate the position of each loop $l_i^j$ in the loop nest. Using the above characteristics, a loop nest can be represented as a sequence vector of L=(P,B,INC) in which $B_{ij}$=($Blow_{ij}$, $Bhi_{ij}$), $INC_{ij}$ identifies the loop increments for the loop indices $l_i^j$, and P indicates the positions of the loops in the loop nest.

With the above notation on tensor representation and loop nest representation, accesses to tensors is as follows. For each tensor (Ti) and for each dimension $d_k$ that is blocked/sliced m times, Equation 1 below represents an affine transformation $Z_k^i$ of the loop indices $l_{d_k}^j$ that form the index $l_{d_k}$.

$$Z_k^i = (l_k^0, l_k^1, \ldots, l_k^{m-1}) \rightarrow l_{d_k} \quad\quad \text{Equation 1}$$

Given a linear algebra/deep learning computation subroutine with a loop nest (e.g., from open source code, abstract syntax tree (AST) tree from LLVM, etc.) tensor accesses can be decoded as a sequence of vectors as represented in Equation 2 below.

$$X = [V_0, V_1, \ldots, V_{N-1}] \quad\quad \text{Equation 2}$$

In Equation 2 above, $V_i$ represents how a tensor (T) is accessed. The tensor access notation $V_i$ consists of vectors $Z_j^i$, where $Z_j^i$ encodes the affine transformation of the loop indices that form the index for dimension j for tensor T. Such an affine transformation is encoded via a (sparse) vector of integers that constitutes the coefficients of the affine transformations. For example, consider three nested loops/indices noted as $I_1, I_2, I_3$ in which an index I is formed by the affine transformation I=42*$I_1$+0*$I_2$+1*$I_3$. In this example, an affine transformation is represented by the vector: (42, 0, 1).

Figure 4:
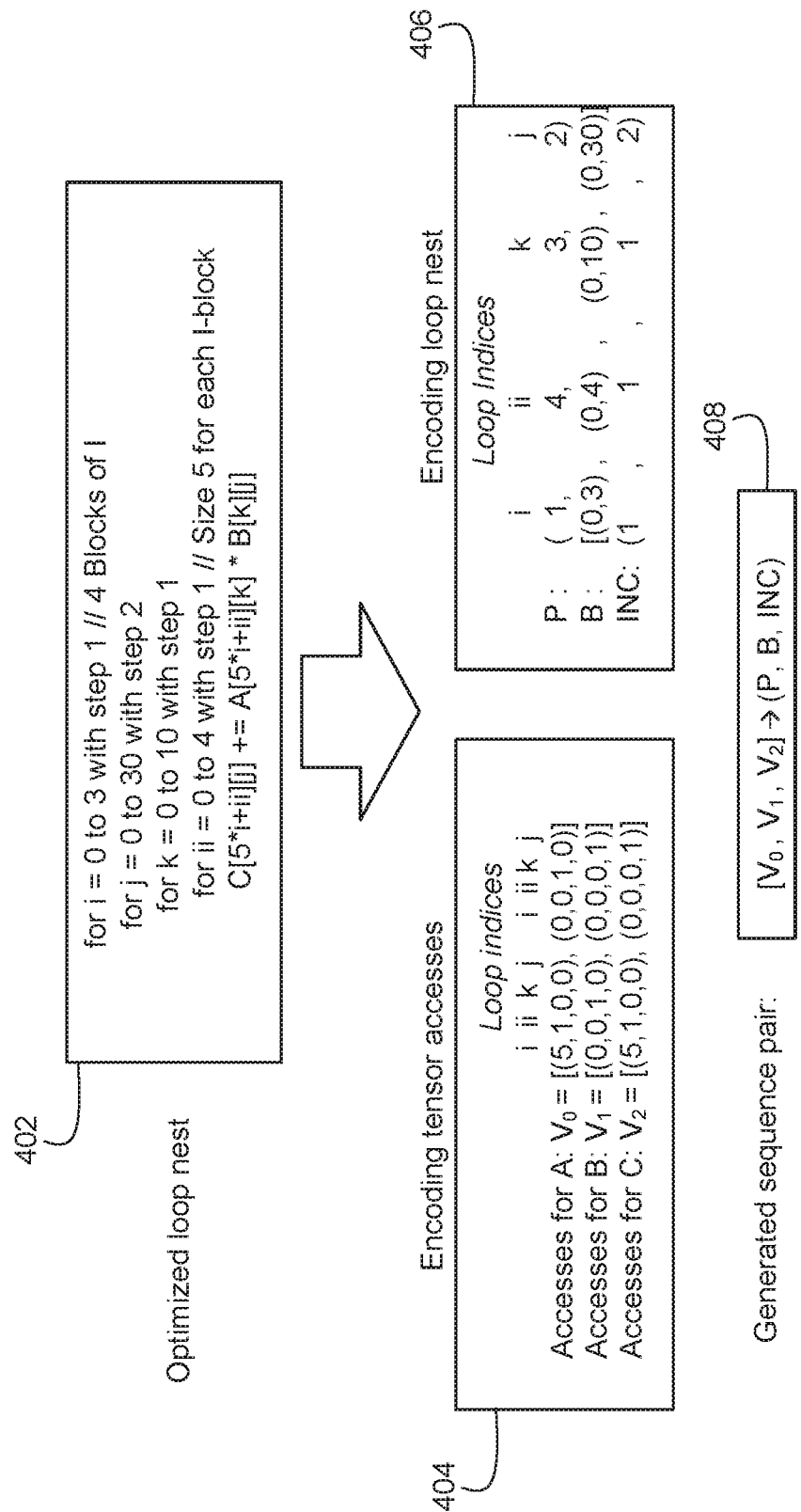
FIG. 4 is an example of encoding an optimized loop nest into a sequence pair for use in training the loop tuner model of FIGS. 1-3.

FIG. 4 is an example of encoding an optimized loop nest into a sequence pair for use in training the loop tuner model 104 of FIGS. 1-3 for loop order optimization. In examples disclosed herein, the sequence generator 112 generates sequence pairs. A generated sequence pair represented as $[V_0, V_1, \ldots, V_{N-1}] \rightarrow (P,B,INC)$ includes a first input tensor access sequence $[V_0, V_1, \ldots, V_{N-1}]$ representing accesses to tensors in an innermost tensor loop and a corresponding first output loop nest sequence (P,B,INC) representing a tuned/optimized loop nest. The example sequence generator 112 can generate sequence pairs based on previously tuned/optimized input programs that can be obtained, for example, from open source programs/codes or LLVM intermediate representations of such open source programs. The term LLVM is not an acronym but is a term in itself that refers to a specific compiler stack/ecosystem. LLVM code representations are defined by the LLVM Foundation. However, examples disclosed herein may be implemented in connection with any other suitable type of compiler intermediate representation for any other type of machine or architecture in addition to or instead of a machine-specific LLVM intermediate representation. In addition, since many tensors for ML applications contain mostly zeros, the example sequence generator 112 is configured to handle sparse data. As such, the sequence generator 112 can use embedding to translate the sparse, integer-encoded vocabulary of the above-described sequence pairs into a lower dimensional space vector.

FIG. 4 depicts an example of how the sequence generator 112 encodes program code of an example optimized loop nest order 402 to sequence pair notation including an example tensor access sequence 404 and a corresponding example loop nest sequence 406. The example optimized loop nest order 402 includes four nested "for" loops in blocked/tiled organization to perform the general matrix multiplication (GEMM) subroutine of Equation 3 below.

$$C[5*i+ii][j] += A[5*i+ii][k]*B[k][j] \quad\quad \text{Equation 3}$$

In Equation 3 above, the GEMM subroutine operates on three tensors identified as tensor A, tensor B, and tensor C. Each of the four nested loops of the optimized loop nest order 402 is represented by a corresponding loop index of i, j, k, and ii. The first nested "for" loop corresponding to index "i" is at a first position indicated as P=1 in the example loop nest sequence 406 and includes four iterations (e.g., i=0 to 3, represented as B=(0,3) in the example loop nest sequence 406). The second "for" loop corresponding to index "j" is at a second position indicated as P=2 in the example loop nest sequence 406 and includes 31 iterations (e.g., j=0 to 30, represented as B=(0,30) in the example loop nest sequence 406). The third "for" loop corresponding to index "k" is at a third position indicated as P=3 in the example loop nest sequence 406 and includes 11 iterations (e.g., k=0 to 10, represented as B=(0,10) in the example loop nest sequence 406). The fourth "for" loop corresponding to index "ii" is at a fourth position indicated as P=4 in the example loop nest sequence 406 and includes 5 iterations (e.g., ii=0 to 4, represented as B=(0,4) in the example loop nest sequence 406). In the illustrated example, the nested loops for indices "i", "k", and "ii" are performed at a first loop increment noted in FIG. 4 as "step 1" and indicated as INC=1 in the example loop nest sequence 406. The nested loop for index "j" is performed at a second loop increment noted as "step 2" and indicated as INC=2 in the example loop nest sequence 406. In this manner, optimized loop nest orders, such as the optimized loop nest order 402 of FIG. 4, organize nested loops to be performed in successive increments in which some loop nests are performed in the same loop increment/step and other loop nests are performed in subsequent loop increments/steps. This improves cache use, and thus performance, by ordering nested loops that access the same data to be executed in the same loop increment/step so that cache maintains copies of the same data accessed frequently across those nested loops in the same increment/step.

The example sequence generator 112 generates the example tensor access sequence 404 that include tensor access sequence vectors $[V_0, V_1, \ldots, V_{N-1}]$ representing accesses to tensors in the nested loops of the optimized loop nest order 402. The example tensor access sequence 404 encodes accesses for the multiple tensors A, B, C into vectors "$V_0$", "$V_1$", "$V_2$" according to the loop indices "i", "ii", "k", "j" and the terms of the GEMM subroutine shown in Equation 3 above. For example, the C tensor accesses of the GEMM subroutine of Equation 3 are expressed as C[5*i+ii][j], which is encoded as $V_2$=[(5,1,0,0), (0,0,0,1)] in the example tensor access sequence 404. In this $V_2$ tensor access vector notation, the encoding (5,1,0,0) represents that the first bracketed portion (e.g., [5*i+ii]) of the C tensor accesses multiplies index "i" by five (e.g., 5*i) and multiplies index "ii" by one (e.g., 1*ii, expressed simply as ii in the first bracketed portion of the C tensor accesses) while summing zero values for the indices "k" and "j" (e.g., noted by the absence of "k" and "j" sum terms from the first bracketed portion of the C tensor accesses). Also in the $V_2$ tensor access vector notation, the encoding (0,0,0,1) represents that the second bracketed portion (e.g., [j]) of the C tensor accesses multiplies index "j" by one (e.g., 1*j, expressed simply as j in the second bracketed portion of the C tensor accesses) while summing zero values for the indices "i", "ii", and "k" (e.g., noted by the absence of "i", "ii", and "k" sum terms from the second bracketed portion of the C tensor accesses).

The A tensor accesses of the GEMM subroutine of Equation 3 above are expressed as A[5*1+ii][k] and are encoded as $V_0$=[(5,1,0,0), (0,0,1,0)] in the example tensor access sequence 404 in substantially the same format as described above in connection with the $V_2$ tensor access notation for the C tensor accesses. In addition, the B tensor accesses of the GEMM subroutine of Equation 3 above are expressed as B[k][j] and are encoded as $V_1$=[(0,0,1,0), (0,0,0,1)] in the example tensor access sequence 404 in substantially the same format as described above in connection with the $V_2$ tensor access notation for the C tensor accesses. The tensor access sequence vectors "$V_0$", "$V_1$", "$V_2$" are referred to as sparse data because of the large number of zero entries in the data.

The example sequence generator 112 generates the example loop nest sequence 406 as a loop nest sequence (P,B,INC) representing a tuned/optimized loop nest of the optimized loop nest order 402. The example loop nest sequence 406 encodes accesses for the multiple tensors A, B, C into permutation vectors (P), boundaries (B) defined by low/hi loop bound pairs ($Blow_{ij}$, $Bhi_{ij}$), and loop increments (INC) according to the loop indices "i", "ii", "k", "j".

The example sequence generator 112 uses the tensor access sequence 404 and the loop nest sequence 406 to generate an example input-output training data sequence pair 408. The example input-output training data sequence pair 408 includes a first input tensor access sequence [$V_0$, $V_1$, $V_2$] and a first output loop nest sequence (P,B,INC) for use by the model trainer 114 (FIG. 1) as training data to train the loop tuner model 104.

Figure 5:
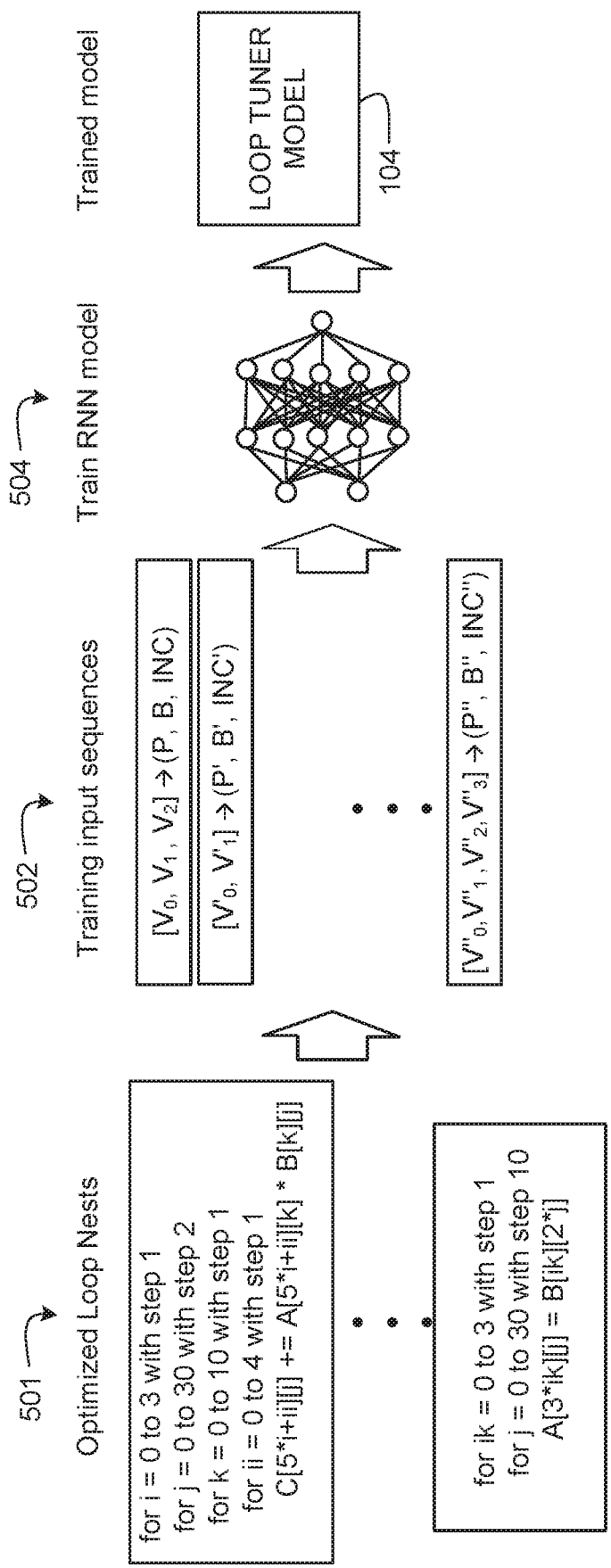
FIG. 5 is an example of training the loop tuner model of FIGS. 1-3 using training data sequence pairs.

FIG. 5 is an example of training the loop tuner model 104 of FIGS. 1-3 using example training data sequence pairs 502. The model trainer 114 (FIG. 1) trains an RNN model (e.g., to generate the loop tuner model 104), as indicated by reference numeral 504, using the training data sequence pairs 502 to recognize patterns and/or associations between the input and output training data sequences during a training phase to generate the trained loop tuner model 104. After training at reference numeral 504, the loop tuner model 104 follows the learned patterns and/or associations when processing subsequent input tensor access sequences [$V_0$, $V_1$, ..., $V_{N-1}$] of unknown programming code to generate optimized loop nest orders.

During the training phase at reference numeral 504, the model trainer 114 uses numerous training data sequence pairs 502 of the format [$V_0$, $V_1$, ..., $V_{N-1}$]→(P,B,INC) (e.g., generated as described above in connection with FIG. 4 from a large set of previously optimized loop nests 501 of programs/kernels) to establish multiple learned patterns and/or associations in the loop tuner model 104 between different sequence pairs. This is referred to as training for sequence-to-sequence translation in LSTM model architectures, which may be used to implement the loop tuner model 104. When implemented using an LTMS model architecture, the example model trainer 114 can use deep learning techniques, such as Stochastic Gradient Descent with Adam optimizer, to train the loop tuner model 104. In other examples, other deep learning techniques may be used and/or the loop tuner model trainer 114 may be implemented using any other suitable ML/AI model architecture.

After an initial training of the example loop tuner model 104, the AI-based loop tuner 100 can subsequently use the loop tuner model 104 to optimize subsequent programs containing nested loops. For example, after providing the trained loop tuner model 104, the memory interface 110 (FIG. 1) receives or accesses a new program, and the sequence generator 112 (FIG. 1) extracts or generates a tensor access sequence [$V_0$, $V_1$, ..., $V_{N-1}$]$_{NEW}$ based on the tensor accesses of the new program. The example model executor 120 provides the tensor access sequence [$V_0$, $V_1$, ..., $V_{N-1}$]$_{NEW}$ to the trained loop tuner model 104 which generates a corresponding predicted output loop nest sequence (P,B,INC)$_{NEW}$ for an optimized loop ordering. The tensor accesses of the program can then be executed with more efficient cache use based on the optimized tensor access sequence [$V_0$, $V_1$, ..., $V_{N-1}$]$_{NEW}$. In addition, the AI-based loop tuner 100 can continuously re-train the loop tuner model 104 based on new sequence pairs [$V_0$, $V_1$, ..., $V_{N-1}$]$_{NEW}$→(P,B,INC)$_{NEW}$ when new tensor access sequences [$V_0$, $V_1$, ..., $V_{N-1}$]$_{NEW}$ satisfy a performance threshold. Such loop order optimizations and continuous re-training can also be implemented when calling manually tuned optimized subroutines in the innermost loop nest level. In such instances, the tensors and indices used as arguments for the dense linear algebra subroutine to be tuned are used to generate the tensor access sequences [$V_0$, $V_1$, ..., $V_{N-1}$] for the program code being optimized.

While an example manner of implementing AI-based loop tuner 100 of FIGS. 1-3 is illustrated in FIG. 1, one or more of the elements, processes and/or devices illustrated in FIG. 1 may be combined, divided, re-arranged, omitted, eliminated and/or implemented in any other way. Further, the example memory interface 110, the example sequence generator 112, the example model trainer 114, the example comparator 116, the example notifier 118, the example model executor 120, the example code generator 122, and the example loop tuner model 104 and/or, more generally, the example AI-based loop tuner 100 of FIG. 1 may be implemented by hardware, software, firmware and/or any combination of hardware, software and/or firmware. Thus, for example, any of the example memory interface 110, the example sequence generator 112, the example model trainer 114, the example comparator 116, the example notifier 118, the example model executor 120, the example code generator 122, and the example loop tuner model 104 and/or, more generally, the example AI-based loop tuner 100 could be implemented by one or more analog or digital circuit(s)/circuitry, logic circuits/circuitry, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example memory interface 110, the example sequence generator 112, the example model trainer 114, the example comparator 116, the example notifier 118, the example model executor 120, the example code generator 122, and/or the example loop tuner model 104 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example AI-based loop tuner 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, means for generating may be implemented by the sequence generator 112. In examples disclosed herein, means for training may be implemented by the model trainer 114. In examples disclosed herein, means for storing may be implemented by the memory interface 110. In examples disclosed herein, means for comparing may be implemented by the comparator 116. In examples disclosed herein, means for generating a sequence and/or sequence pairs may be implemented by the sequence generator 112. In examples disclosed herein, means for generating a message and/or notifying may be implemented by the notifier 118. In examples disclosed herein, means for executing a model may be implemented by the model executor 120. In examples disclosed herein, means for generating executable code may be implemented by the code generator 122.

Figure 6:
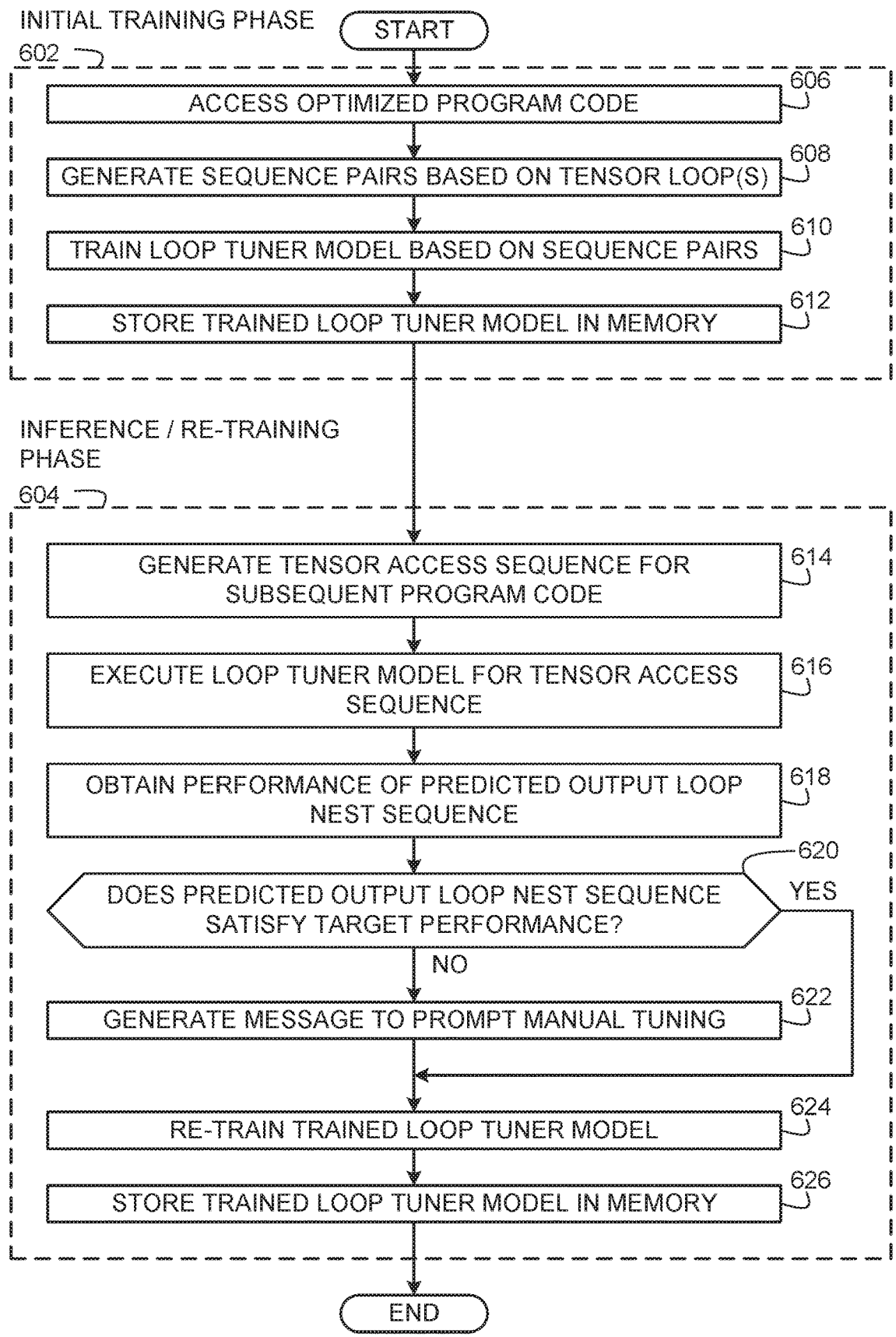
FIG. 6 is a flowchart representative of example computer-readable instructions that may be executed to implement the example AI-based loop tuner of FIGS. 1-3 to generate optimized loop orderings in accordance with teachings of this disclosure.
Figure 7:
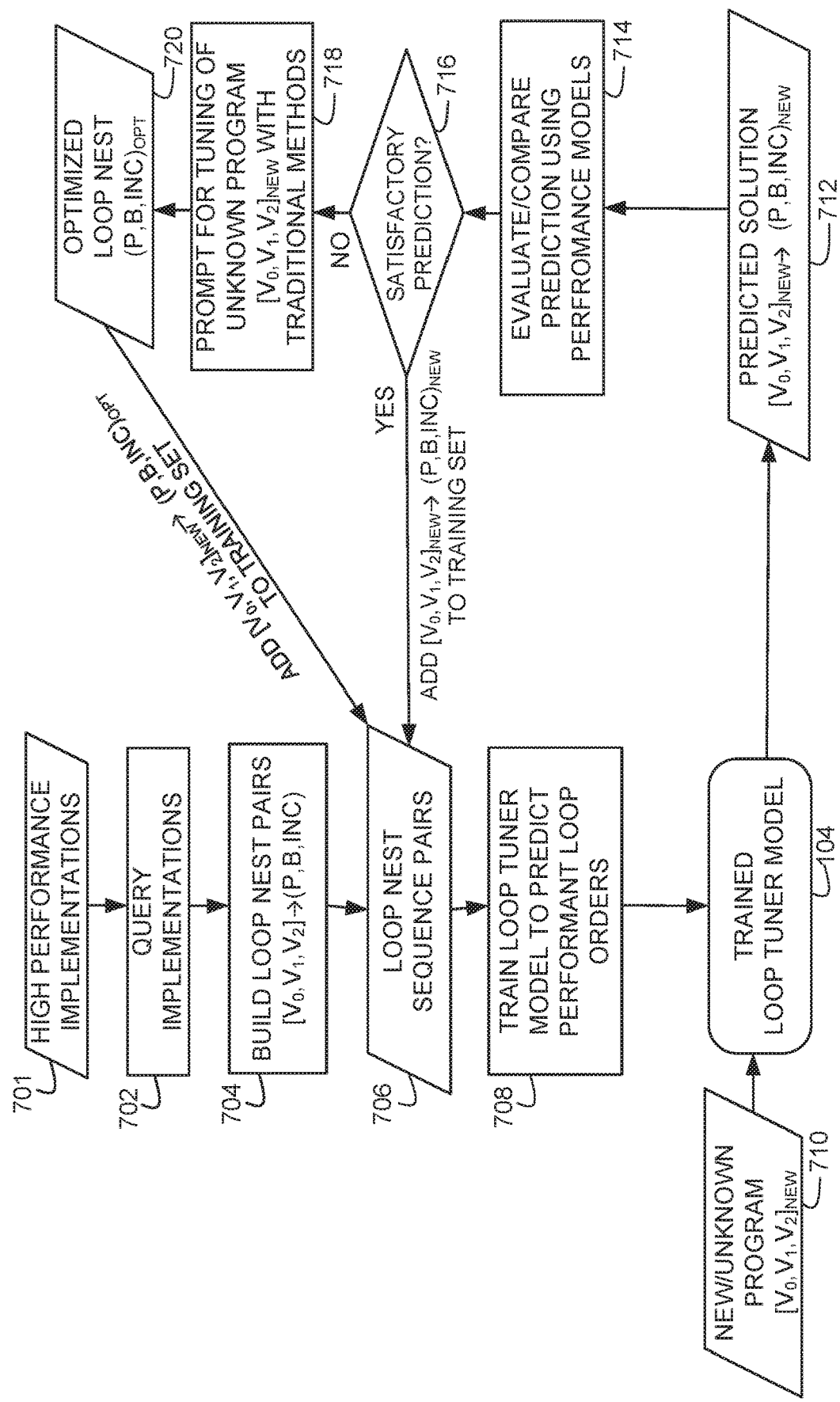
FIG. 7 is another flowchart representative of example computer-readable instructions that may be executed to implement the example AI-based loop tuner of FIGS. 1-3 to generate optimized loop orderings in accordance with teachings of this disclosure.

Flowcharts representative of example hardware logic, machine readable instructions, hardware-implemented state machines, and/or any combination thereof for implementing the AI-based loop tuner 100 of FIG. 1 are shown in FIGS. 6 and 7. The machine-readable instructions may be one or more executable programs or portion(s) of an executable program for execution by a computer processor such as the processor 812 shown in the example processor platform 800 discussed below in connection with FIG. 8. The program(s) may be embodied in software stored on a non-transitory computer-readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program(s) is/are described with reference to the flowcharts illustrated in FIGS. 6 and 7, many other methods of implementing the example AI-based loop tuner 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example instructions of FIGS. 6 and 7 may be implemented using executable instructions (e.g., computer and/or machine-readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 depicts a flowchart representative of example computer-readable instructions that may be executed to implement the example AI-based loop tuner 100 of FIGS. 1-3 to generate optimized loop orderings for tensor loops in computer program code. The example instructions represented in FIG. 6 may be implemented in an optimizer in association with a compiler (e.g., the optimizer 202 associated with the compiler 204 of FIG. 2) and/or as part of a runtime library (e.g., the optimizer runtime library 302 of FIG. 3). First ones of the instructions represented in FIG. 6 correspond to a training phase 602 and second ones of the instructions correspond to an inference/re-training phase 604. Execution of the example instructions of FIG. 6 begin at block 606 at which the memory interface 110 (FIG. 1) accesses optimized high-performance program code. For example, the memory interface 110 may access the program code 106 (FIG. 1) from a repository of known high-performance programs that have been previously optimized for cache-efficient loop ordering. Such high-performance programs are used in the illustrated example to train the loop tuner model 104.

The example sequence generator 112 generates a plurality of training data sequence pairs based on tensor loop(s) in the program code (block 608). A first one of the sequence pairs (e.g., $[V_0, V_1, \ldots, V_{N-1}] \rightarrow (P,B,INC)$) includes: (i) an input tensor access sequence (e.g., $[V_0, V_1, \ldots, V_{N-1}]$) representing accesses to tensors in a loop nest of the program code, and (ii) an output loop nest sequence (e.g., (P,B,INC)) represents a tuned loop nest corresponding to the accesses to the tensors in the loop nest. The model trainer 114 (FIG. 1) trains an RNN based on the training data sequence pairs as training data (block 610). For example, the training of the RNN is to implement the trained loop tuner model 104. As such, the loop tuner model 104 is trained to tune loop ordering and/or blocking of a subsequent computer program based on a subsequent input tensor access sequence (e.g., $[V_0, V_1, \ldots, V_{N-1}]_{NEW}$) representing accesses to one or more tensors in a loop nest of the subsequent computer program. The memory interface 110 stores, in the memory 102 (FIG. 1), the trained loop tuner model 104 corresponding to the RNN training (block 612).

After the loop tuner model 104 is trained during the example initial training phase 602, it may be subsequently used during the example inference/re-training phase 604 to generate optimized loop orderings for subsequent computer programs (e.g., new/unknown programs, or programs not previously encountered by the loop tuner model 104). The example inference/re-training phase 604 begins at block 614 at which the sequence generator 112 generates a tensor access sequence (e.g., $[V_0, V_1, \ldots, V_{N-1}]_{NEW}$) for subsequent program code (e.g., a new/unknown program, or a program not previously encountered by the loop tuner model 104). The example model executor 120 (FIG. 1) executes the loop tuner model 104 for the tensor access sequence as input data (block 616). For example, the model executor 120 executes the loop tuner model 104 for the tensor access sequence generated at block 614 to obtain a corresponding predicted output loop nest sequence (e.g., $(P,B,INC)_{NEW}$) from the loop tuner model 104. The predicted output loop nest sequence (e.g., $(P,B,INC)_{NEW}$) represents a tuned loop nest corresponding to accesses to tensors in a tensor loop of the subsequent program code. The example memory interface 110 (FIG. 1) obtains collected performance metrics of the predicted output loop nest sequence (e.g., $(P,B,INC)_{NEW}$) (block 618). For example, the code generator 122 (FIG. 1) may generate executable code based on the predicted output loop nest sequence (e.g., $(P,B,INC)_{NEW}$), and the executable code may be executed by a processor that also generates and collects performance metrics (e.g. via hardware performance counters) and stores the collected performance metrics in a memory (e.g., the memory 102 of FIG. 1).

The example comparator 116 (FIG. 1) determines whether the predicted output loop nest sequence satisfies a target performance (block 620). For example, the comparator 116 performs a comparison of a target performance threshold to the collected performance metrics of the predicted output loop nest sequence (e.g., $(P,B,INC)_{NEW}$) predicted by the loop tuner model 104. In some examples, the target performance threshold is selected based on a loop order tuning performed using manual tuning or a reference loop tuner model separate from the loop tuner model 104. In other examples, the target performance threshold is selected based on user-choice of a desired performance. When the comparison indicates that the collected performance metrics do not satisfy the target performance, the example notifier 118 (FIG. 1) generates a message to prompt a user to perform manual tuning (block 622). For example, the user may perform manual tuning corresponding to the tensor access sequence (e.g., $[V_0, V_1, \ldots, V_{N-1}]_{NEW}$) for subsequent program code to achieve a desired performance (e.g., the target performance threshold). After the manual tuning of block 622, or when the comparison indicates that the collected performance metrics satisfy the target performance at block 620, the example model trainer 114 re-trains the trained loop tuner model 104 (block 624). For example, when the collected performance metrics satisfy the target performance at block 620, the model trainer 114 can re-train the trained loop tuner model 104 based on a new training sequence pair (e.g., [$V_0$, $V_1$, . . . , $V_{N-1}$]$_{NEW}$→((P,B,INC)$_{NEW}$) that includes the tensor access sequence (e.g., [$V_0$, $V_1$, . . . , $V_{N-1}$]$_{NEW}$) generated at block 614 and the predicted output loop nest sequence (e.g., (P,B,INC)$_{NEW}$) generated at block 616. Alternatively, when the collected performance metrics do not satisfy the target performance at block 620, the model trainer 114 can re-train the trained loop tuner model 104 based on a new training sequence pair (e.g., [$V_0$, $V_1$, . . . , $V_{N-1}$]$_{NEW}$→(P,B,INC)$_{NEW}$) that includes the tensor access sequence (e.g., [$V_0$, $V_1$, . . . , $V_{N-1}$]$_{NEW}$) generated at block 614 and an output loop nest sequence (e.g., (P,B,INC)$_{NEW}$) corresponding to the manual tuning resulting from the prompting to manually tune of block 622. The example memory interface 110 stores the trained loop tuner model 104 in the memory 102 (block 626). The example instructions of FIG. 6 then stop executing and/or control returns to a calling function or process that invoked execution of the instructions of FIG. 6. Although the example initial training phase 602 and the example inference/re-training phase 604 are shown in the same flowchart of FIG. 6, instructions of the different phases 602 and 604 may be executed by separate processors in separate systems such as when the trained loop tuner model 104 is trained at a first processor system and distributed to one or more other processor systems for use in optimizing tensor loops during inference/re-training phases 604 at those processor systems.

FIG. 7 depicts another flowchart representative of example computer-readable instructions that may be executed to implement the example AI-based loop tuner 100 of FIGS. 1-3 to generate optimized loop orderings for tensor loops in computer program code. The instructions of FIG. 7 begin at block 702 at which the example memory interface 110 (FIG. 1) queries a repository of high-performance program code implementations 701 that have been previously optimized for cache-efficient loop ordering. At block 704, the example sequence generator 112 (FIG. 1) builds loop nest pairs (e.g., [$V_0$, $V_1$, $V_2$]→(P,B,INC)) as training set data 706. The example model trainer 114 (FIG. 1) trains an RNN based on the loop nest pairs training data to generate the loop tuner model 104 to predict performant loop orders (block 708).

The example model executor 120 (FIG. 1) then executes the trained loop tuner model 104 based on a tensor access sequence (e.g., [$V_0$, $V_1$, $V_2$]$_{NEW}$) of subsequent program code 710 (e.g., a new/unknown program, or a program not previously encountered by the loop tuner model 104) to generate a predicted output loop nest sequence (e.g., (P,B,INC)$_{NEW}$). The example sequence generator 112 (FIG. 1) can generate a predicted solution sequence pair (e.g., [$V_0$, $V_1$, $V_2$]$_{NEW}$→(P,B,INC)$_{NEW}$) 712 based on the input tensor access sequence (e.g., [$V_0$, $V_1$, $V_2$]$_{NEW}$) and the corresponding predicted output loop nest sequence (e.g., (P,B,INC)$_{NEW}$). The example comparator 116 evaluates the predicted solution sequence pair (e.g., [$V_0$, $V_1$, $V_2$]$_{NEW}$→(P,B,INC)$_{NEW}$) by performing comparisons of collected performance metrics of the predicted solution sequence pair to desired performance model(s) (block 714).

When the comparator 116 determines at block 716 that the predicted solution sequence pair 712 is satisfactory (e.g., the collected performance metrics satisfy the performance model(s)), the example model trainer 114 adds the predicted solution sequence pair 712 (e.g., [$V_0$, $V_1$, $V_2$]$_{NEW}$→(P,B,INC)$_{NEW}$) to the training set 706 as a new training data sequence pair for subsequent re-training of the loop tuner model 104. Alternatively, when the comparator 116 determines at block 716 that the predicted solution sequence pair 712 is not satisfactory (e.g., the collected performance metrics satisfy the performance model(s)), the example notifier 118 generates a message to prompt a user to manually tune the subsequent program code 710 corresponding to the input tensor access sequence [$V_0$, $V_1$, $V_2$]$_{NEW}$ using prior, traditional loop order tuning methods (block 718). The manual tuning resulting from the prompting of block 718 produces an optimized loop nest sequence (e.g., ((P,B,INC)$_{OPT}$) 720. The example sequence generator 112 generates an optimized solution sequence pair (e.g., [$V_0$, $V_1$, $V_2$]$_{NEW}$→((P,B,INC)$_{OPT}$) based on the input tensor access sequence (e.g., [$V_0$, $V_1$, $V_2$]$_{NEW}$) and the corresponding optimized loop nest sequence (e.g., ((P,B,INC)$_{OPT}$). The example model trainer 114 adds the optimized solution sequence pair (e.g., [$V_0$, $V_1$, $V_2$]$_{NEW}$→((P,B,INC)$_{OPT}$) to the training set 706 as a new training data sequence pair for subsequent re-training of the loop tuner model 104. The example instructions of FIG. 6 then stop executing and/or control returns to a calling function or process that invoked execution of the instructions of FIG. 7. Although the example of FIG. 7 is shown as a continuous process, some instructions may be executed as part of an initial training phase (e.g., the initial training phase 602 of FIG. 6) and other instructions may be executed as part of an example inference/re-training phase (e.g., the example inference/re-training phase 604 of FIG. 6). For example, instructions of blocks 702, 704, and 708 may be executed as part of the initial training phase, and instructions of blocks 714, 716, and 718 may be executed as part of the inference/re-training phase.

Figure 8:
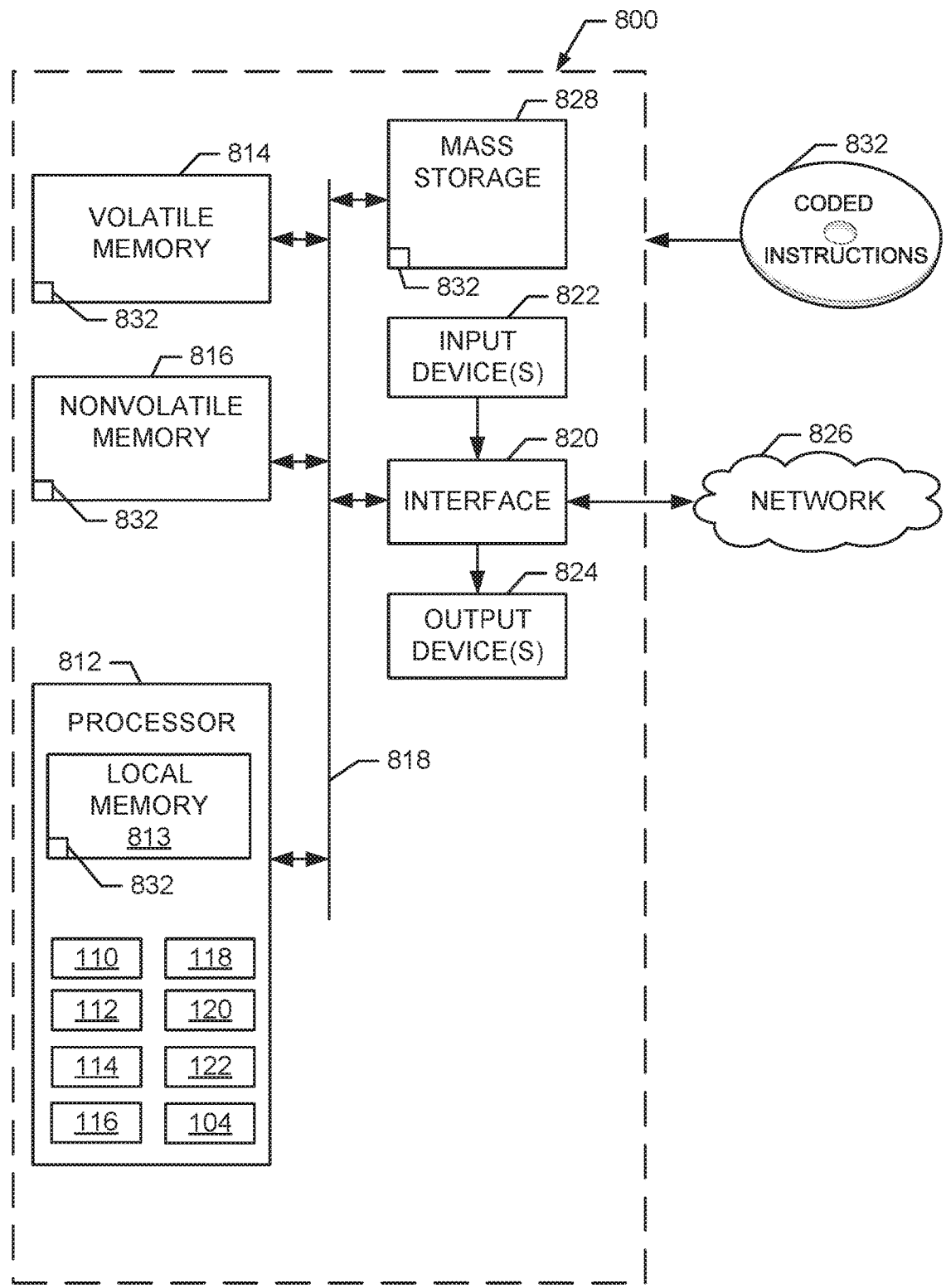
FIG. 8 is a block diagram of an example processing platform structured to execute the instructions of FIGS. 6 and 7 to implement the example AI-based loop tuner of FIGS. 1-3 to generate optimized loop orderings in accordance with teachings of this disclosure.

FIG. 8 is a block diagram of an example processing platform 800 structured to execute the instructions of FIGS. 6 and 7 to implement the example AI-based loop tuner 100 of FIGS. 1-3 to generate optimized loop orderings in accordance with teachings of this disclosure. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor 812 may be a semiconductor based (e.g., silicon based) device. The processor 812 may be used to implement the processor 306 of FIG. 3. In this example, the processor 812 implements the example memory interface 110, the example sequence generator 112, the example model trainer 114, the example comparator 116, the example notifier 118, the example model executor 120, the example code generator 122, and the example loop tuner model 104.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller. In some examples, the memory 102 (FIG. 1), or a portion thereof, may be implemented by the volatile memory 814 and/or the non-volatile memory 816.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In some examples, the memory 102 (FIG. 1), or a portion thereon, may be implemented by the mass storage devices 828.

Machine executable instructions 832 represented by the flowcharts of FIGS. 6 and 7 may be stored in the mass storage device 828, in the volatile memory 814, in the non-volatile memory 816, and/or on a removable non-transitory computer-readable storage medium such as a CD or DVD.

From the foregoing, it will be appreciated that example methods, apparatus and articles of manufacture have been disclosed that implement AI-based optimizing/tuning of loop orders in blocked dense basic linear algebra subroutines. Examples disclosed herein optimize cache use for tensor operations using an AI-based system that arranges loop orders in manners that increase the likelihood that multiple iterative accesses to the same tensor data will occur sufficiently close in time so that the same tensor data is still available in cache. This increases the number of tensor data accesses that result in cache hits (e.g., requested data still resides in cache) rather than cache misses which would require slower data accesses from slower memory interfaces.

Example AI-based loop tuners disclosed herein can be used to automatically train loop tuner models to more quickly and more effectively optimize loop orders in program code relative to prior tuning techniques such as manual tuning. Example AI-based loop tuners disclosed herein can be used to continuously re-train a loop tuner model after deployment of that loop tuner model in connection with code compilers and/or runtime libraries. In this manner, the optimization performance of loop tuner models using example AI-based loop tuners disclosed herein is not static based on only prior training data and scenarios known at the time of an initial training. Instead, example AI-based loop tuners disclosed herein can continuously re-train example loop tuner models so that such loop tuner models continuously learn over time based on new programming scenarios as the AI-based loop tuners encounter and optimize different programming code. By continuous re-training, AI-based loop tuners disclosed herein can adapt loop tuner models over time to new programming techniques, new mathematical operations, different data inputs, new processors, etc. For example, given the increase in the number of deep learning kernel libraries that are developed to meet the needs of modern AI workloads, examples disclosed herein can use continuous re-training to automate performance tuning of loop tuner models. This is particularly useful since end users often use data inputs not known of at a development time when a loop tuner model is initially trained. The disclosed methods, apparatus and articles of manufacture are accordingly directed to one or more improvement(s) in the functioning of a computer Example methods, apparatus, systems, and articles of manufacture that implement AI-based optimizing/tuning of loop orders in blocked dense basic linear algebra subroutines are disclosed herein. Further examples and combinations thereof include the following:

Example 1 is an apparatus to tune loop ordering and/or blocking in computer programs. The apparatus of Example 1 includes a sequence generator to generate a plurality of sequence pairs, a first one of the sequence pairs including (i) a first input sequence representing first accesses to first tensors in a first loop nest of a first computer program, and (ii) a first output sequence representing a first tuned loop nest corresponding to the first accesses to the first tensors in the first loop nest; a model trainer to train a recurrent neural network using the sequence pairs as training data, the recurrent neural network to be trained to tune loop ordering of a second computer program based on a second input sequence representing second accesses to second tensors in a second loop nest of the second computer program; and a memory interface to store, in memory, a trained model corresponding to the recurrent neural network.

Example 2 includes the subject matter of Example 1 and optionally includes: a comparator to compare a target performance to a second performance of a second output sequence predicted by the trained model, the second output sequence representing a second tuned loop nest corresponding to the second accesses to the second tensors in the second loop nest; and when the comparison indicates that the second performance satisfies the target performance, the model trainer is to re-train the trained model based on a second sequence pair including the second input sequence and the second output sequence.

Example 3 includes the subject matter of any one or more of Examples 1-2 and optionally includes that, when the second performance does not satisfy the target performance, the model trainer is to re-train the trained model based on a third sequence pair including the second input sequence and a third output sequence, the third output sequence based on a manual tuning of the second input sequence.

Example 4 includes the subject matter of any one or more of Examples 1-3 and optionally includes that the target performance is based on a loop order tuning performed separate from the trained model.

Example 5 includes the subject matter of any one or more of Examples 1-4 and optionally includes that the recurrent neural network is a long short-term memory network or a generative adversarial network.

Example 6 includes the subject matter of any one or more of Examples 1-5 and optionally includes that the first input sequence includes a variable that encodes an affine transformation of a loop index of the first loop nest.

Example 7 is a non-transitory computer readable storage medium including instructions that, when executed by a processor, cause the processor to at least: generate a plurality of sequence pairs, a first one of the sequence pairs including (i) a first input sequence representing first accesses to first tensors in a first loop nest of a first computer program, and (ii) a first output sequence representing a first tuned loop nest corresponding to the first accesses to the first tensors in the first loop nest; train a recurrent neural network using the sequence pairs as training data, the recurrent neural network to be trained to tune loop ordering of a second computer program based on a second input sequence representing second accesses to second tensors in a second loop nest of the second computer program; and store, in memory, a trained model corresponding to the recurrent neural network.

Example 8 includes the subject matter of Example 7 and optionally includes that the instructions are further to cause the processor to: compare a target performance to a second performance of a second output sequence predicted by the trained model, the second output sequence representing a second tuned loop nest corresponding to the second accesses to the second tensors in the second loop nest; and when the comparison indicates that the second performance satisfies the target performance, re-train the trained model based on a second sequence pair including the second input sequence and the second output sequence.

Example 9 includes the subject matter of any one or more of Examples 7-8 and optionally includes that when the second performance does not satisfy the target performance, the instructions are further to cause the processor to re-train the trained model based on a third sequence pair including the second input sequence and a third output sequence, the third output sequence based on a manual tuning of the second input sequence.

Example 10 includes the subject matter of any one or more of Examples 7-9 and optionally includes that the target performance is based on a loop order tuning performed separate from the trained model.

Example 11 includes the subject matter of any one or more of Examples 7-10 and optionally includes that the recurrent neural network is a long short-term memory network or a generative adversarial network.

Example 12 includes the subject matter of any one or more of Examples 7-11 and optionally includes that the first input sequence includes a variable that encodes an affine transformation of a loop index of the first loop nest.

Example 13 is a method to tune loop ordering and/or blocking in computer programs. The method of Example 13 includes generating a plurality of sequence pairs, a first one of the sequence pairs including (i) a first input sequence representing first accesses to first tensors in a first loop nest of a first computer program, and (ii) a first output sequence representing a first tuned loop nest corresponding to the first accesses to the first tensors in the first loop nest; training a recurrent neural network using the sequence pairs as training data, the recurrent neural network to be trained to tune loop ordering of a second computer program based on a second input sequence representing second accesses to second tensors in a second loop nest of the second computer program; and storing, in memory, a trained model corresponding to the recurrent neural network.

Example 14 includes the subject matter of Example 13 and optionally includes: comparing a target performance to a second performance of a second output sequence predicted by the trained model, the second output sequence representing a second tuned loop nest corresponding to the second accesses to the second tensors in the second loop nest; and when the comparison indicates that the second performance satisfies the target performance, re-training the trained model based on a second sequence pair including the second input sequence and the second output sequence.

Example 15 includes the subject matter of any one or more of Examples 13-14 and optionally includes, when the second performance does not satisfy the target performance, re-training the trained model based on a third sequence pair including the second input sequence and a third output sequence, the third output sequence based on a manual tuning of the second input sequence.

Example 16 includes the subject matter of any one or more of Examples 13-15 and optionally includes that the target performance is based on a loop order tuning performed separate from the trained model.

Example 17 includes the subject matter of any one or more of Examples 13-16 and optionally includes that the recurrent neural network is a long short-term memory network or a generative adversarial network.

Example 18 includes the subject matter of any one or more of Examples 13-17 and optionally includes that the first input sequence includes a variable that encodes an affine transformation of a loop index of the first loop nest.

Example 19 is an apparatus to tune loop ordering and/or blocking in computer programs. The apparatus of Example 19 includes: means for generating a plurality of sequence pairs, a first one of the sequence pairs including (i) a first input sequence representing first accesses to first tensors in a first loop nest of a first computer program, and (ii) a first output sequence representing a first tuned loop nest corresponding to the first accesses to the first tensors in the first loop nest; means for training a recurrent neural network using the sequence pairs as training data, the recurrent neural network to be trained to tune loop ordering of a second computer program based on a second input sequence representing second accesses to second tensors in a second loop nest of the second computer program; and means for storing, in memory, a trained model corresponding to the recurrent neural network.

Example 20 includes the subject matter of Example 19 and optionally includes: means for comparing a target performance to a second performance of a second output sequence predicted by the trained model, the second output sequence representing a second tuned loop nest corresponding to the second accesses to the second tensors in the second loop nest; and when the comparison indicates that the second performance satisfies the target performance, the means for training is to re-train the trained model based on a second sequence pair including the second input sequence and the second output sequence.

Example 21 includes the subject matter of any one or more of Examples 19-20 and optionally includes that, when the second performance does not satisfy the target performance, the means for training is to re-train the trained model based on a third sequence pair including the second input sequence and a third output sequence, the third output sequence based on a manual tuning of the second input sequence.

Example 22 includes the subject matter of any one or more of Examples 19-21 and optionally includes that the target performance is based on a loop order tuning performed separate from the trained model.

Example 23 includes the subject matter of any one or more of Examples 19-22 and optionally includes that the recurrent neural network is a long short-term memory network or a generative adversarial network.

Example 24 includes the subject matter of any one or more of Examples 19-23 and optionally includes that the first input sequence includes a variable that encodes an affine transformation of a loop index of the first loop nest.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to tune loop ordering in computer programs, the apparatus comprising:
   a sequence generator to generate a plurality of sequence pairs based on tensor loops in a first computer program, wherein a first sequence pair of the plurality of sequence pairs includes:
   (i) a first input tensor access sequence representing first accesses to first tensors in a first loop nest of the first computer program, and (ii) a first output loop nest sequence representing a first tuned loop nest corresponding to the first accesses to the first tensors in the first loop nest of the first computer program;
   a model trainer to train a loop tuner model corresponding to a recurrent neural network using the plurality of sequence pairs as training data, wherein the loop tuner model is trained to tune loop ordering of a second computer program based on a second input tensor access sequence representing second accesses to second tensors in a second loop nest of the second computer program; and
   a memory interface to store, in memory, the trained loop tuner model corresponding to the recurrent neural network.

2. The apparatus as defined in claim 1, further including:
   a comparator to compare a target performance to a performance of a second output loop nest sequence predicted by the trained loop tuner model corresponding to the recurrent neural network, wherein the second output loop nest sequence represents a second tuned loop nest corresponding to the second accesses to the second tensors in the second loop nest of the second computer program; and
   when the comparison indicates that the performance of the second output loop nest sequence satisfies the target performance, the model trainer is to re-train the trained loop tuner model corresponding to the recurrent neural network based on a second sequence pair of the plurality of sequence pairs including the second input tensor access sequence and the second output loop nest sequence.

3. The apparatus as defined in claim 2, wherein when the performance of the second output loop nest sequence does not satisfy the target performance, the model trainer is to re-train the trained loop tuner model corresponding to the recurrent neural network based on a third sequence pair of the plurality of sequence pairs including the second input tensor access sequence and a third output loop nest sequence, and wherein the third output loop nest sequence is based on a manual tuning of the second input tensor access sequence.

4. The apparatus as defined in claim 2, wherein the target performance is based on a loop order tuning performed separately from the trained loop tuner model corresponding to the recurrent neural network.

5. The apparatus as defined in claim 1, wherein the recurrent neural network is a long short-term memory network or a generative adversarial network.

6. The apparatus as defined in claim 1, wherein the first input tensor access sequence includes a variable that encodes an affine transformation of a loop index of the first loop nest of the first computer program.

7. A non-transitory computer-readable medium comprising instructions that, when executed by a processor, cause the processor to at least:
   generate a plurality of sequence pairs based on tensor loops in a first computer program, wherein a first sequence pair of the plurality of sequence pairs includes: (i) a first input tensor access sequence representing first accesses to first tensors in a first loop nest of the first computer program, and (ii) a first output loop nest sequence representing a first tuned loop nest corresponding to the first accesses to the first tensors in the first loop nest of the first computer program;
   train a loop tuner model corresponding to a recurrent neural network using the plurality of sequence pairs as training data, wherein the loop tuner model is trained to tune loop ordering of a second computer program based on a second input tensor access sequence representing second accesses to second tensors in a second loop nest of the second computer program; and
   store, in memory, the trained loop tuner model corresponding to the recurrent neural network.

8. The non-transitory computer-readable medium as defined in claim 7, wherein the instructions, when executed by the processor, further cause the processor to:
   compare a target performance to a performance of a second output loop nest sequence predicted by the trained loop tuner model corresponding to the recurrent neural network, wherein the second output loop nest sequence represents a second tuned loop nest corresponding to the second accesses to the second tensors in the second loop nest of the second computer program; and
   when the comparison indicates that the performance of the second output loop nest sequence satisfies the target performance, re-train the trained loop tuner model corresponding to the recurrent neural network based on a second sequence pair of the plurality of sequence pairs including the second input tensor access sequence and the second output loop nest sequence.

9. The non-transitory computer-readable medium as defined in claim 8, wherein when the performance of the second output loop nest sequence does not satisfy the target performance, the instructions, when executed by the processor, further cause the processor to re-train the trained loop tuner model corresponding to the recurrent neural network based on a third sequence pair of the plurality of sequence pairs including the second input tensor access sequence and a third output loop nest sequence, and wherein the third output loop nest sequence is based on a manual tuning of the second input tensor access sequence.

10. The non-transitory computer-readable medium as defined in claim 8, wherein the target performance is based on a loop order tuning performed separately from the trained loop tuner model corresponding to the recurrent neural network.

11. The non-transitory computer-readable medium as defined in claim 7, wherein the recurrent neural network is a long short-term memory network or a generative adversarial network.

12. The non-transitory computer-readable medium as defined in claim 7, wherein the first input tensor access sequence includes a variable that encodes an affine transformation of a loop index of the first loop nest of the first computer program.

13. A method to tune loop ordering in computer programs, the method comprising:
generating a plurality of sequence pairs based on tensor loops in a first computer program, wherein a first sequence pair of the plurality of sequence pairs includes: (i) a first input tensor access sequence representing first accesses to first tensors in a first loop nest of the first computer program, and (ii) a first output loop nest sequence representing a first tuned loop nest corresponding to the first accesses to the first tensors in the first loop nest of the first computer program;
training a loop tuner model corresponding to a recurrent neural network using the plurality of sequence pairs as training data, wherein the loop tuner model is trained to tune loop ordering of a second computer program based on a second input tensor access sequence representing second accesses to second tensors in a second loop nest of the second computer program; and
storing, in memory, the trained loop tuner model corresponding to the recurrent neural network.

14. The method as defined in claim 13, further including:
comparing a target performance to a performance of a second output loop nest sequence predicted by the trained loop tuner model corresponding to the recurrent neural network, wherein the second output loop nest sequence represents a second tuned loop nest corresponding to the second accesses to the second tensors in the second loop nest of the second computer program; and
when the comparison indicates that the performance of the second output loop nest sequence satisfies the target performance, re-training the trained loop tuner model corresponding to the recurrent neural network based on a second sequence pair of the plurality of sequence pairs including the second input tensor access sequence and the second output loop nest sequence.

15. The method as defined in claim 14, further including, when the performance of the second output loop nest sequence does not satisfy the target performance, re-training the trained loop tuner model corresponding to the recurrent neural network based on a third sequence pair of the plurality of sequence pairs including the second input tensor access sequence and a third output loop nest sequence, wherein the third output loop nest sequence is based on a manual tuning of the second input tensor access sequence.

16. The method as defined in claim 14, wherein the target performance is based on a loop order tuning performed separately from the trained loop tuner model corresponding to the recurrent neural network.

17. The method as defined in claim 13, wherein the recurrent neural network is a long short-term memory network or a generative adversarial network.

18. The method as defined in claim 13, wherein the first input tensor access sequence includes a variable that encodes an affine transformation of a loop index of the first loop nest of the first computer program.

19. An apparatus to tune loop ordering in computer programs, the apparatus comprising:
means for generating a plurality of sequence pairs based on tensor loops in a first computer program, wherein a first sequence pair of the plurality of sequence pairs includes: (i) a first input tensor access sequence representing first accesses to first tensors in a first loop nest of the first computer program, and (ii) a first output loop nest sequence representing a first tuned loop nest corresponding to the first accesses to the first tensors in the first loop nest of the first computer program;
means for training a loop tuner model corresponding to a recurrent neural network using the plurality of sequence pairs as training data, wherein the loop tuner model is trained to tune loop ordering of a second computer program based on a second input tensor access sequence representing second accesses to second tensors in a second loop nest of the second computer program; and
means for storing, in memory, the trained loop tuner model corresponding to the recurrent neural network.

20. The apparatus as defined in claim 19, further including:
means for comparing a target performance to a performance of a second output loop nest sequence predicted by the trained loop tuner model corresponding to the recurrent neural network, wherein the second output loop nest sequence represents a second tuned loop nest corresponding to the second accesses to the second tensors in the second loop nest of the second computer program; and
when the comparison indicates that the performance of the second output loop nest sequence satisfies the target performance, the means for training is to re-train the trained loop tuner model corresponding to the recurrent neural network based on a second sequence pair of the plurality of sequence pairs including the second input tensor access sequence and the second output loop nest sequence.

21. The apparatus as defined in claim 20, wherein when the performance of the second output loop nest sequence does not satisfy the target performance, the means for training is to re-train the trained loop tuner model corresponding to the recurrent neural network based on a third sequence pair of the plurality of sequence pairs including the second input tensor access sequence and a third output loop nest sequence, and wherein the third output loop nest sequence is based on a manual tuning of the second input tensor access sequence.

22. The apparatus as defined in claim 20, wherein the target performance is based on a loop order tuning performed separately from the trained loop tuner model corresponding to the recurrent neural network.

23. The apparatus as defined in claim 19, wherein the recurrent neural network is a long short-term memory network or a generative adversarial network.

24. The apparatus as defined in claim 19, wherein the first input tensor access sequence includes a variable that encodes an affine transformation of a loop index of the first loop nest of the first computer program.

25. An apparatus to tune loop ordering in computer programs, the apparatus comprising:
processor circuitry;
sequence generator instructions to cause the processor circuitry to generate a plurality of sequence pairs based on tensor loops in a first computer program, wherein a first sequence pair of the plurality of sequence pairs includes: (i) a first input tensor access sequence representing first accesses to first tensors in a first loop nest of the first computer program, and (ii) a first output loop nest sequence representing a first tuned loop nest corresponding to the first accesses to the first tensors in the first loop nest of the first computer program;
model trainer instructions to cause the processor circuitry to train a loop tuner model corresponding to a recurrent neural network using the plurality of sequence pairs as training data, wherein the loop tuner model is trained to tune loop ordering of a second computer program based on a second input tensor access sequence representing second accesses to second tensors in a second loop nest of the second computer program; and
a memory interface to store, in memory, the trained loop tuner model corresponding to the recurrent neural network.

26. The apparatus as defined in claim 25, further including:
comparator instructions to cause the processor circuitry to compare a target performance to a performance of a second output loop nest sequence predicted by the trained loop tuner model corresponding to the recurrent neural network, wherein the second output loop nest sequence represents a second tuned loop nest corresponding to the second accesses to the second tensors in the second loop nest of the second computer program; and
when the comparison indicates that the performance of the second output loop nest sequence satisfies the target performance, the model trainer instructions are to cause the processor circuitry to re-train the trained loop tuner model corresponding to the recurrent neural network based on a second sequence pair of the plurality of sequence pairs including the second input tensor access sequence and the second output loop nest sequence.

27. The apparatus as defined in claim 26, wherein when the performance of the second output loop nest sequence does not satisfy the target performance, the model trainer instructions are to cause the processor circuitry to re-train the trained loop tuner model corresponding to the recurrent neural network based on a third sequence pair of the plurality of sequence pairs including the second input tensor access sequence and a third output loop nest sequence, and wherein the third output loop nest sequence is based on a manual tuning of the second input tensor access sequence.

28. The apparatus as defined in claim 26, wherein the target performance is based on a loop order tuning performed separately from the trained loop tuner model corresponding to the recurrent neural network.

29. The apparatus as defined in claim 25, wherein the recurrent neural network is a long short-term memory network or a generative adversarial network.

30. The apparatus as defined in claim 25, wherein the first input tensor access sequence includes a variable that encodes an affine transformation of a loop index of the first loop nest of the first computer program.

* * * * *